US006645276B2

(12) United States Patent
Kang et al.

(10) Patent No.: US 6,645,276 B2
(45) Date of Patent: Nov. 11, 2003

(54) SOLID STATE POLYMER ELECTROLYTE FACILITATED TRANSPORT MEMBRANES CONTAINING SURFACTANTS

(75) Inventors: Yong Soo Kang, Seoul (KR); Jong Ok Won, Seoul (KR); Bum Suk Jung, Seoul (KR); Hye Hun Park, Seoul (KR); Seong Geun Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/061,033

(22) Filed: Feb. 1, 2002

(65) Prior Publication Data

US 2002/0162456 A1 Nov. 7, 2002

(30) Foreign Application Priority Data

Feb. 21, 2001 (KR) .................................. 2001-0008793
Feb. 21, 2001 (KR) ......................................... 2001-8793

(51) Int. Cl.[7] .............................................. B01D 53/22
(52) U.S. Cl. ........................ 96/5; 95/45; 95/50; 96/14
(58) Field of Search ........................ 95/44, 45, 50; 96/4, 5, 14; 585/818, 819

(56) References Cited

U.S. PATENT DOCUMENTS

| 3,410,794 | A | * | 11/1968 | Li ................................ 208/308 |
| 3,719,590 | A | * | 3/1973 | Li et al. ....................... 585/818 |
| 3,758,603 | A | * | 9/1973 | Steigelmann et al. ........ 585/818 |
| 3,758,605 | A | * | 9/1973 | Hughes et al. ............... 585/818 |
| 3,847,672 | A | * | 11/1974 | Trocciola et al. .............. 429/46 |
| 4,318,714 | A | * | 3/1982 | Kimura et al. .................. 95/49 |
| 4,614,524 | A | * | 9/1986 | Kraus ............................. 95/50 |
| 5,015,268 | A | * | 5/1991 | Ho ................................. 95/50 |
| 5,062,866 | A | * | 11/1991 | Ho ................................. 95/50 |
| 5,110,326 | A | * | 5/1992 | Sirkar et al. ..................... 96/5 |
| 5,135,547 | A | * | 8/1992 | Tsou et al. ...................... 95/44 |
| 5,163,977 | A | * | 11/1992 | Jensvold et al. ................ 95/45 |
| 5,191,151 | A | * | 3/1993 | Eriksen et al. .................. 95/50 |
| 5,229,465 | A | * | 7/1993 | Tsuchida et al. ......... 525/326.2 |
| 5,336,298 | A | * | 8/1994 | Quinn et al. .................... 95/49 |
| 5,411,580 | A | * | 5/1995 | Tsuchida et al. ................. 96/5 |
| 5,445,669 | A | * | 8/1995 | Nakabayashi et al. ........... 96/5 |
| 5,618,334 | A | * | 4/1997 | Ozcayir et al. ................. 96/14 |
| 5,863,420 | A | * | 1/1999 | Kwasniewski et al. ...... 208/308 |
| 6,187,196 | B1 | * | 2/2001 | Way et al. ..................... 210/640 |
| 6,468,331 | B2 | * | 10/2002 | Kang et al. ..................... 96/12 |

* cited by examiner

Primary Examiner—Robert H. Spitzer
(74) Attorney, Agent, or Firm—Rosenberg, Klein & Lee

(57) ABSTRACT

A facilitated transport membrane with improved permeance and selectivity to alkene-based unsaturated hydrocarbons is provided. The facilitated transport membrane includes a solid state polymer electrolyte and additionally a non-volatile surfactant that enhances long-term operation stability. In preparing the facilitated transport membrane for separation of alkenes, a porous supporting membrane is coated with a solid polymer electrolyte layer having a non-volatile polymer, a non-volatile surfactant, and a salt of a transition metal capable of complexing selectively and reversibly with alkenes.

13 Claims, No Drawings

SOLID STATE POLYMER ELECTROLYTE FACILITATED TRANSPORT MEMBRANES CONTAINING SURFACTANTS

BACKGROUND OF THE INVENTION

1. Field of the Invention

The present invention relates to a facilitated transport membrane with improved permeance and selectivity to alkene-based unsaturated hydrocarbons, which includes a solid state polymer electrolyte and additionally a non-volatile surfactant that remarkably enhances the long-term operation stability. More particularly, the present invention relates to a facilitated transport membrane prepared by coating a solid state polymer electrolyte layer, comprising a surfactant, a salt of a transition metal and a non-volatile polymer, on a porous supporting membrane excellent in permeability and mechanical strength, thereby the facilitated transport membrane having high permeability and selectivity to alkenes and long-term operation stability and comprising the complex of a metal and a polymer ligand in the solid state polymer electrolyte has a long-lasting activity as a carrier of alkene even under a long-term dry operating condition.

2. Background of the Related Art

Hydrocarbon mixtures of alkenes such as ethylene and propylene and alkanes such as ethane and propane are primarily produced during a naphtha cracking process. Alkenes such as ethylene and propylene are an important raw material in the petrochemical industry. For that reason, the alkene/alkane separation technology is of great importance in the related industry. Distillation is chiefly used as a separation method for alkene/alkane mixtures such as ethylene/ethane or propylene/propane. However, the separation of those mixtures requires large-scale facilities and high energy expenses, because the alkene in the alkene/alkane mixture is similar to the alkane in molecular size and such physical properties as relative volatility.

For example, the distillation method needs a 120 to 160-stage distillation column at a temperature of −30° C. and a high pressure of about 20 atmospheres for separation of an ethylene/ethane mixture, or a 180 to 200-stage distillation column with a reflux ratio of greater than 10 at −30° C. and several atmospheres. There is thus a need for a novel separation method as a substitute for the conventional distillation method that requires large-scale facilities and high energy expenses.

A substitute for the conventional distillation method is a membrane-based separation method, which has amazingly progressed for the past several decades in the field of gaseous mixture separation, such as $N_2/O_2$, $N_2/CO_2$, or $N_2/CH_4$ separation.

Such a classical separation membrane for gaseous mixtures is not suitable to acquire a satisfactory separation performance for an alkene/alkane mixture because the alkene of the mixture is very similar in molecular size and physical property to the alkane. In this regard, a facilitated transport membrane based on a different concept from the classical separation membrane for gaseous mixtures is suggested as a separation membrane having a high separation performance for alkene/alkane mixtures.

The membrane-based separation performance is achieved depending on the difference in permeability among the constituent substances of the mixture. The materials of the membrane mostly have a limitation on their application because of a counter-correlation between permeability and selectivity. The use of the facilitated transport concept increases both permeability and selectivity and thereby extends the application range of the membrane. With a carrier contained in the membrane that reacts reversibly with a specific constituent substance of the mixture, the reversible reaction gives an additional transport of the specific substance and facilitates the substance transport. Accordingly, the total substance transport is the sum of the substance transport caused by the Fick law and the carrier-mediated transport, which is called "facilitated transport".

A supported liquid membrane is an example of the membrane based on the principle of the facilitated transport. The supported liquid membrane is prepared by coating a porous thin film with a solution of a carrier in a solvent such as water and operated in the liquid state. Such a supported liquid membrane is somewhat satisfactory in separation performance.

U.S. Pat. Nos. 3,758,603 and 3,758,605 (by Steigelmann and Hughes), for example, disclose a supported liquid membrane containing silver salts having a selectivity to ethylene/ethane of about 400 to 700 and a permeability to ethylene of 60 GPU [1 GPU=1×10$^{-6}$ cm$^3$ (STP)/cm$^2$ cmHgsec], the separation performance of the membrane is considerably satisfactory. However, the supported liquid membrane has the facilitated transport ability only in a wet condition, causing a loss of the solvent and a reduced separation performance with an elapse of time and not maintaining the initial separation performance for a long time.

To solve this problem, Kimura et al. suggests a facilitated transport membrane using silver salts and an ion exchange membrane (U.S. Pat. No. 4,318,714). However, the membrane has the facilitated transport ability only in a wet condition as in the case of the supported liquid membrane.

In addition, U.S. Pat. Nos. 5,015,268 and 5,062,866 (by Ho) disclose a method for forming a complex of silver salts with a water soluble polymer, such as polyvinylalcohol. However, the separation performance is satisfactory only upon passing a feed gas saturated with water or swelling the membrane with ethylene glycol or water. In all the above-stated methods, the separation membranes are required to contain water or a similar solvent and maintain a wet condition. A loss of the solvent over time is thus unavoidable when these membranes are used in separating a dry mixture of hydrocarbon gases that does not contain a solvent such as water. So, there is a need for a method for periodically feeding a solvent to maintain the separation membrane in a wet condition. But, such a method is inapplicable to the actual separation.

Krause et al. suggests another facilitated transport membrane as disclosed in U.S. Pat. No. 4,614,524, in which an ion exchange membrane such as Nafion is ion-exchanged to a silver ion and plasticized with glycerol. The membrane exhibits a low selectivity to ethylene/ethane of only about 10 when using a dry feed mixture or even no selectivity without a plasticizer, and causes a loss of the plasticizer with an elapse of time.

In a supported liquid membrane, a volatile plasticizer, or saturating a feed gas with vapor of the volatile plasticizer is required to maintain the activity of the carrier. Such a supported liquid membrane is also impractical because it causes a loss of the plasticizer with an elapse of time to deteriorate the membrane stability and requires removal of the plasticizer such as water periodically in order to maintain the activity of the carrier from the separated product.

Accordingly, as a substitute for the conventional distillation method that requires high facility and energy expenses in separation of alkene/alkane mixtures, there is a need for a separation membrane excellent in selectivity and permeability and destitute of a volatile component to have a long-term lasting activity even when a dry feed mixture is used.

SUMMARY OF THE INVENTION

Accordingly, the present invention is directed to a stabilized solid polymer electrolyte facilitated transport membrane that substantially obviates one or more problems due to limitations and disadvantages of the related art. An object of the present invention is to provide a facilitated transport membrane suitable for separation of alkenes from alkanes in an alkene/alkane mixture and excellent in permeability and selectivity to alkenes and long-term operation stability in a dry operating condition, thereby maintaining the activity of the carrier without the supply of a liquid solvent.

To achieve the object of the present invention, there is provided a facilitated transport membrane suitable for separation of alkene-based hydrocarbons that includes: a polymer electrolyte layer comprising a salt of a transition metal selectively and reversibly reactive to an alkene, a non-volatile polymer, and a surfactant for maintaining the activity of the transition metal, the polymer electrolyte layer being in a solid state at an operating temperature; and a porous supporting membrane.

Hereinafter, the present invention will be described in detail.

The facilitated transport membrane according to the present invention comprises a solid polymer electrolyte selectively permeable to alkenes, and a porous supporting membrane for supporting the solid polymer electrolyte.

The supporting membrane as used herein may include any membrane that is excellent in permeability and maintains a satisfactory mechanical strength. For example, a general porous polymer membrane or a porous ceramic supporting membrane is suitable as the supporting membrane. Also, the supporting membrane may have any shape of flat sheet, spiral wound or hollow fiber.

The solid polymer electrolyte as used herein comprises a metal salt that acts as a carrier, a non-volatile polymer, and a non-volatile surfactant that stabilizes the electrolyte. The metal salt in the electrolyte is not simply dispersed in or blended with the polymer but solvated into a metal cation and a salt anion on the polymer. The surfactant as used herein maintains the activity of the metal salt and remarkably increases the stability of the polymer electrolyte. Accordingly, unlike the conventional membrane, the facilitated transport membrane of the present invention needs neither water for maintaining the activity of the carrier nor another additive for swelling the polymer matrix, and selectively enhances the transfer of alkenes in a dry condition with remarkably increased operation stability.

In the facilitated transport membrane of the present invention, the electrolyte comprising a metal salt acting as a carrier and a non-volatile polymer has a substantial effect on the selective separation of alkenes, and its characteristic determines the selective permeable separation of alkenes from the corresponding alkanes.

The metal salt comprising the cation of the transition metal and the anion of the salt is solvated into ions on the polymer so that the cation of the metal reacts reversibly with the double bond of the alkenes to form a complex that participates in the facilitated transport. Namely, the cation of the transition metal in the electrolyte has an interaction with the anion of the salt, the polymer and the alkene, of which the selection guarantees a membrane excellent in both selectivity and permeability. The stability of the selected polymer and the metal complex formed also plays an important role in the long-term operation.

It is well known that some transition metals react reversibly with alkenes in the solution (See. Chem. Rev. 1973). The ability of the transition metal ion as a carrier is largely dependent on the intensity of the π-complexation with alkenes. The intensity of the π-complexation with alkenes is determined primarily by the electronegativity, which is a measure of the relative strength of an atom in a molecule to attract bonding electrons to itself. The electronegativity values of transition metals are presented in Table 1.

TABLE 1

The Electronegativity Values of Transition Metals

| Transition Metals | Sc | Ti | V | Cr | Mn | Fe | Co | Ni | Cu |
|---|---|---|---|---|---|---|---|---|---|
| Electronegativity | 1.4 | 1.5 | 1.6 | 1.7 | 1.6 | 1.8 | 1.9 | 1.9 | 1.9 |
| Transition Metals | Y | Zr | Nb | Mo | Tc | Ru | Rh | Pd | Ag |
| Electronegativity | 1.3 | 1.3 | 1.6 | 2.2 | 1.9 | 2.2 | 2.3 | 2.2 | 1.9 |
| Transition Metals | La | Hf | Ta | W | Re | Os | Ir | Pt | Au |
| Electronegativity | 1.0 | 1.3 | 1.5 | 2.4 | 1.9 | 2.2 | 2.2 | 2.3 | 2.5 |

With the greater electronegativity, the metal atom draws bonding electrons more strongly. If the electronegativity of the metal is excessively high, the metal is not suitable for the facilitated carrier because it is susceptible to irreversible reaction with the n electrons of the alkene; otherwise, if the electronegativity is too low, the metal is also impractical as a carrier due to its weak interaction with the alkene.

For reversible reaction between the transition metal ion and the alkene, the electronegativity of the metal is preferably in the range of 1.6 to 2.3. Examples of the suitable transition metal may include Mn, Fe, Co, Ni, Cu, Mo, Tc, Ru, Rh, Pd, Ag, Re, Os, Ir, Pt, or complexes thereof.

To increase the reversible reactivity of the transition metal ion with the alkene, the anion of the transition metal plays an important role in determining the intensity and the rate of the interaction between a carrier and alkene. In order for the transition metal to act as a carrier, the transition metal salt MX is solvated on the polymer to form a complex as given by the following reaction I:

Here, [G] and M—X—[G] represent the functional group of the polymer and the complex, respectively. The ability of solvation of a transition metal salt into the polymer is usually dependent on the dielectric constant of the polymer. Transition metal salts are not readily dissolved in a polymer when the polymer has a low polarity. With the lower lattice energy of the transition metal salt, the anion forms a weak ionic bond or ion pair with the cation and the salt is easily dissolved in a polymer.

It is therefore preferable to select the anion of the transition metal salt that has a low lattice energy with respect to the cation of the transition metal, in order to facilitate the salvation of the transition metal salt. The lattice energies of the representative transition metals are presented in Table 2.

TABLE 2

Lattice Energies of Metallic Salts [KJ/mol]

|  | $Li^+$ | $Na^+$ | $K^+$ | $Ag^+$ | $Cu^+$ | $Co^{2+}$ | $Mo^{2+}$ | $Pd^{2+}$ | $Ni^{2+}$ | $Ru^{3+}$ |
|---|---|---|---|---|---|---|---|---|---|---|
| $F^-$ | 1036 | 923 | 823 | 967 | 1060 | 3018 |  |  | 3066 |  |
| $Cl^-$ | 853 | 786 | 715 | 915 | 996 | 2691 | 2733 | 2778 | 2772 | 5245 |
| $Br^-$ | 807 | 747 | 682 | 904 | 979 | 2629 | 2742 | 2741 | 2709 | 5223 |
| $I^-$ | 757 | 704 | 649 | 889 | 966 | 2545 | 2630 | 2748 | 2623 | 5222 |
| $CN^-$ | 849 | 739 | 669 | 914 | 1035 |  |  |  |  |  |
| $NO_3^-$ | 848 | 756 | 687 | 822 | 854 | 2626 |  |  | 2709 |  |
| $BF_4^-$ | 705 | 619 | 631 | 658 | 695 | 2127 |  |  | 2136 |  |
| $ClO_4^-$ | 723 | 648 | 602 | 667 | 712 |  |  |  |  |  |
| $CF_3SO_3^-$ | 779 | 685 | 600 | 719 | 793 |  |  |  |  |  |
| $CF_3CO_2^-$ | 822 | 726 | 658 | 782 | 848 |  |  |  |  |  |

In the facilitated transport membrane of the present invention, the transition metal salt preferably has a lattice energy of less than 1,000 KJ/mol, reducing the tendency of the anion of the transition metal salt to form a strong ion pair with the cation. Among the metal salts listed in Table 2, the suitable anion may include $F^-$, $Cl^-$, $Br^-$, $I^-$, $CN^-$, $NO_3^-$, $BF_4^-$ $ClO_4^-$, $CF_3SO_3^-$ or $CF_3CO_2^-$ that forms a salt with $Ag^+$ or $Cu^+$ and is not specifically limited to those listed in Table 2.

The tendency of the anion to form a strong ion pair with the cation decreases in the order of $F^-<<Cl^-<Br^-<I^-\sim SCN^-<ClO_4^-\sim CF_3SO_3^-<BF_4^-\sim AsF_6^-$, with a decrease in the lattice energy. Those anions suitable for the facilitated transport membrane due to their low lattice energy are widely used for electrochemical devices such as batteries or electrochemical capacitors. Examples of such an anion may include, if not specifically limited to, $SCN^-$, $ClO_4^-$, $CF_3SO_3^-$, $BF_4^-$, $AsF_6^-$, $PF_6^-$, $SbF_6^-$, $AlCl_4^-$, $N(SO_2CF_3)_2^-$, and $C(SO_2CF_3)_3^-$.

The facilitated transport membrane of the present invention may include not only monosalts of the transition metal but also complex salts of the transition metal, such as $(M_1)_x(M_x)_{x'}X_y$ or $(M_1)_x(X_1)_y(M_2)_{x'}(X_2)_{y'}$ or organic salt-transition metal salt (where $M_1$ and $M_2$ each represent a cation and X, $X_1$ and $X_2$ each represent an anion; and, x, x', y, and y' represent any stoichiometrically suitable values), or physical mixtures of at least two of them.

Examples of the complex salt of the transition metal may include $RbAg_4I_5$, $Ag_2HgI_4$, $RbAg_4I_4CN$, $AgHgSI$, $AgHgTeI$, $Ag_3SI$, $Ag_6I_4WO_4$, $Ag_7I_4AsO_4$, $Ag_7I_4PO_4$, $Ag_{19}I_{15}P_2O_7$, $Rb_4Cu_{16}I_7Cl_{13}$, $Rb_3Cu_7Cl_{10}$, AgI-(tetralkyl ammonium iodide), AgI—$(CH_3)_3SI$, $C_6H_{12}N_4$·$CH_3I$—CuI, $C_6H_{12}N_4$·$4CH_3Br$—CuBr, $C_6H_{12}N_4$·$4C_2H_5Br$—CuBr, $C_6H_{12}N_4$·4HCl—CuCl, $C_6H_{12}N_2$·$2CH_3I$—CuI, $C_6H_{12}N_2$·$2CH_3Br$—CuBr, $C_6H_{12}N_2$·$2CH_3Cl$—CuCl, $C_5H_{11}NCH_3I$—CuI, $C_5H_{11}NCH_3Br$—CuBr, and $C_4H_9ON$·$CH_3I$—CuI. But, numerous combinations similar to the complex salts or the salt mixtures as exemplified in the scope of the present invention are also available and the complex salt of the transition metal is not specifically limited to the above-mentioned examples. The tendency of the polar transition metal salt to solvate on the polymer is dependent on the polarity of the polymer. It is thus necessary to choose a polymer having a high polarity in order to increase the interaction with the transition metal salt. The polarity of the polymer is indicated as a dielectric constant. The dielectric constant ϵ of the polymer at the room temperature can be calculated by Equation 1:

$$\epsilon \approx \sigma/7.0 \text{ and } \sigma = (E_{coh}/V) \times 0.5 \qquad \text{[Equation 1]}$$

In the above equation, σ is the solubility parameter, $E_{coh}$ the cohesive energy, V the molar volume. The cohesive energy and the molar volume can be measured by a group contribution method suggested by Fedors (See. D. W. van Krevelen, in "Properties of Polymers", p196). The dielectric constants of the representative polymers are presented in Table 3.

TABLE 3

| POLYMER | Solubility Parameter | Dielectric Constant |
|---|---|---|
| Polypropylene | 16.41 | 2.34 |
| Poly (tetrafluoroethylene) | 20.32 | 2.9 |
| Polycarbonate | 22.30 | 3.29 |
| Poly (N-isopropyl acrylamide) | 24.57 | 3.51 |
| Poly (phenylene sulfide) | 26.75 | 3.82 |
| Poly (methylmethacrylate) | 20.32 | 2.90 |
| Poly (methylene oxide) | 20.41 | 2.92 |
| Poly (methacrylate) | 21.60 | 3.09 |
| Poly (ethyleneimine) | 22.30 | 3.19 |
| Poly (N-dimethyl methacrylate) | 23.62 | 3.37 |
| Poly (vinyl acetate) | 21.60 | 3.09 |
| Poly (epichlorohydrin) | 21.87 | 3.12 |
| Poly (acrylamide) | 39.25 | 5.61 |
| Poly (oxy-2,6-dimethyl-1,4-phenylene) | 22.91 | 3.27 |
| Poly (2-ethyl-2-oxazoline) | 25.73 | 3.68 |
| Poly (vinyl pyrrolidone) | 27.38 | 3.91 |
| Poly (acrylonitrile) | 29.45 | 4.21 |
| Poly (methacrylamide) | 33.26 | 4.75 |
| Poly (vinyl alcohol) | 39.00 | 5.57 |
| Poly (N-dimethyl acrylamide) | 25.21 | 3.60 |

Preferably, the polymer suitable for the solid electrolyte of the facilitated transport membrane according to the present invention has a large dielectric constant of greater than 2.7 so as to readily form a complex with the transition metal salt.

Among the representative polymers listed in Table 3, examples of suitable polymers having a dielectric constant within the defined range include poly(tetrafluoroethylene) (PTFE), polycarbonate, poly(N-isopropyl acrylamide) (NIPAM), poly(phenylene sulfide), poly(methyl methacrylate), poly(methylene oxide), poly(styrene), poly (methacrylate), poly(vinyl acetate), poly(epichlorohydrin), poly(acrylamide), poly(oxy-2,6-dimethyl-1,4-phenylene), poly(2-ethyl-2-oxazoline), poly(vinylpyrrolidone), poly (acrylonitrile), poly(methacrylamide), poly(vinylalcohol), poly(ethyleneimine), poly(N-dimethyl acrylamide), or poly (N-dimethyl methacrylamide).

The facilitated transport membrane of the present invention may include those polymers alone, the homopolymers or copolymers of the polymers, or derivatives containing the polymers as a backbone or a side chain, or physical mixtures of the polymers. Besides the polymers listed in Table 3, other numerous polymers are suitable for the present invention and the polymer as used herein is not specifically limited to the above-mentioned examples. The surfactant used as a stabilizer of the carrier is a compound having both a hydrophobic group and a hydrophilic group and classified into an anionic surfactant, a cationic surfactant, an amphiphilic surfactant, and a non-ionic surfactant.

The anionic surfactant is classified into a carbonate type; a sulfuric acid ester salt type (e.g., higher alcohol sulfuric acid ester salt, sulfuric acid ester, sulfated oil, sulfated fatty acid ester, sulfated oleic acid, etc.); a sulfonate type (e.g., alkylbenzene sulfonate salt, alkylnaphthalene sulfonate salt, AEROSOL-OT, paraffin fulfonate salt, IGEPON-T type, etc.); and a phosphoric acid ester salt type (e.g., higher alcohol phosphoric acid ester salt, etc.). The examples of the suitable anionic surfactant may include sodium laurylate, sodium stearate, sodium oleate, sodium laurylalcohol sulfuric acid ester, ammonium laurylalcohol sulfuric acid ester, mixtures of Ziegler alcohol sulfuric acid ester salts, mixtures of improved oxoalcohol sulfuric acid ester salts, sodium alkylbenzene sulfonate, IGEPON-T type, AEROSOL-OT type, benzene sulfonate, dodecylbenzene sulfonate, tetrapropylene benzene sulfonate (ABS), branched ABS, hard ABS, sodium linear alkylbenzene sulfonate (LAS), calcium dodecylbenzene sulfonate, calcium alkylbenzene sulfonate, $\alpha$-olefin sulfonate (AOS), zinc dialkyldithiol phosphate, and so forth.

The cationic surfactant is largely classified into an amine type (primary amine, secondary amine and tertiary amine), and a quaternary ammonium salt type. The amine type cationic surfactant prepared from a higher alkyl amine includes higher alkyl amine salts and higher alkyl amine ethylene oxide addition products, and the amine type cationic surfactant from a lower alkyl amine includes a SOROMINE A type, a SAPAMINE A type, an ACOVEL A type and an imidazorine type. The quaternary ammonium salt type cationic surfactant prepared from a higher alkyl amine includes alkyltrimethyl ammonium salts and alkyldimethyl benzyl ammonium salts, and the quaternary ammonium salt type cationic surfactant from a lower alkyl amine includes a spamine type quaternary ammonium type and a pyridinium salt type. Examples of the cationic surfactant may include lauryl trimethyl ammonium chloride, lauryl trimethyl ammonium methosulfate, dihydroxyethylstearylamine, SOROMINE A, SAPAMINE A, ACOVEL A, AMINE O, 2-heptadecanylhydroxyethylimidazoline, ONYXAN HSB (refined-onyx Div., Milmaster Onyx Corp.), lauryltrimethylammonium chloride, laurylmethylbenzylammonium chloride, or benzalconium chloride, SAPAMIN, CATANAC SN, setylpyridinium chloride, serylpyridinium bromide, stearamide methylpyridinium chloride, ZELAN AP (Dupont), VELAN PF (I.C.I. Co.) and so forth.

The amphiphilic surfactant is classified into a carbonate type, a sulfuric acid ester salt type, a sulfonate type and a phosphoric acid ester salt type. Examples of the amphonionic surfactant may include lecithin, laurylaminopropionic methyl, sodium laurylaminopropionate, TEGO (Goldschmidt Co.), laurylmethyl betaine, stearyldimethyl betine, lauryldihydroxyethyl betine and so forth.

The non-ionic surfactant has a hydrophilic group and a hydrophobic group. Examples of the non-ionic surfactant may include polyalkyl glucoside, alkyl glucamide, higher alcohol ethylene oxide addition product, alkylphenol ethylene oxide addition product, higher fatty acid ethylene oxide addition product, polyalcohol fatty acid ester ethylene oxide addition product, higher alkylamine ethylene oxide addition product, fatty acid amide ethylene oxide addition product, ethylene oxide addition product of fatty oil, and polypropylene glycol ethylene oxide addition product. The polyalcohol type surfactant includes fatty acid ester of glycerol, fatty acid ester of pentane erithritol, fatty acid ester of sorbitol and sorbitane, fatty acid ester of sugar, fatty acid amide of alkylamine, or alkylester of polyalcohol. Examples of the non-ionic surfactant may include polyethylene glycol lauric acid diester, polyethylene glycol oleic acid diester, PLORONIC (BASF Wyandotte Corp.), pentaerithritol mono palmitate, sorbitane ester type activator (SPN), TWEEN (Atlas Co.), lauric acid monoester, palmitic acid monoester, EXTRA type (Stepan Co.), SUPER-AMIDE (Onyx Co.) and so forth.

Now, a description will be given to a method for preparing the facilitated transport membrane of the present invention.

The preparation of the facilitated transport membrane comprises dissolving a transition metal salt, a polymer and a surfactant in a liquid solvent to prepare a coating solution, applying the coating solution on a porous supporting membrane, and drying the coated membrane. The liquid solvent as used herein may be any solvent that solvates the transition metal and the polymer without damaging the supporting membrane. When the polymer of the solid polymer electrolyte is aqueous, water is usable as the solvent.

The content of the transition metal salt, the polymer and the surfactant in the coating solution is determined in consideration of the thickness of the solid electrolyte layer immediately after the application of the coating solution and after the drying step. For example, the contents of the transition metal salt, the polymer and the surfactant in the coating solution is 5 wt. % so as to form a solid electrolyte layer having a thickness of 100 $\mu$m before drying the coating solution and a final thickness of 5 $\mu$m after the drying step. Preferably, the weight fraction of the polymer in the polymer electrolyte layer is less than 50 wt. %. It is also desirable that the mole ratio of the transition metal to the surfactant is in the range from 10,000:1 to 10:1, because the surfactant may have an adverse effect on the permeability of the membrane when the mole ratio is beyond the above limits.

The method for applying the electrolyte coating solution on the porous supporting membrane is well known in the art and may include blade/knife coating, Mayer bar coating, dip coating, air knife coating, or the like. Preferably, the solid electrolyte layer on the supporting membrane has a small dry thickness after the drying step. However, an extremely small dry thickness of the solid electrolyte layer may fail to close up the pores of the porous supporting membrane or cause a hole due to a pressure difference in operation, thereby deteriorating the selectivity of the membrane. Accordingly, the dry thickness of the solid electrolyte layer is preferably in the range from 0.05 $\mu$m to 10 $\mu$m, more preferably in the range from 0.1 $\mu$m to 3 $\mu$m.

Another characteristic of the facilitated transport membrane thus prepared is a high selectivity to alkenes. The selectivity increases with an increase in the permeability of alkene with respect to alkane. Accordingly, the facilitated transport membrane has a higher separation performance with an increase in the selectivity and thus more suitable for actual application.

The mixed hydrocarbon feed stream separable by the facilitated transport membrane of the present invention may contain principally at least one alkene and at least one alkane, and additionally methane, hydrogen, acetylene, carbon monoxide, carbon dioxide, or the like. Examples of the alkene may include ethylene, propylene, butylenes, isobutylene, etc., and those of the alkane may include ethane, propane, butane, isobutane, etc.

The facilitated transport membrane of the present invention includes a polymer electrolyte that is solid at the operating temperature. The operating temperature as used herein refers to a temperature at which the facilitated transport membrane is actually used. Preferably, the facilitated transport membrane of the present invention is used at an operating temperature that maintains the solid state of the electrolyte and is lower than the dissociation temperature of the transition metal, i.e., below 300° C.

The facilitated transport membrane of the present invention not only has a high selective permeability to alkene but also a high activity in a completely dry condition because it comprises a metal salt and a non-volatile polymer. Furthermore, the facilitated transport membrane is destitute of volatile components and contains a stability to maintain the activity of the metal complex, which guarantees a high long-term operation stability and makes the membrane suitable for alkane/alkene separation.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENT

Hereinafter, the present invention will be described in further detail by way of the following examples, which are not intended to limit the scope of the present invention. The permeance is the pressure-normalized flux measured by the volume of the passing gas through the membrane with a soap bubble flow meter. The unit of the permeance is GPU ($1 \times 10^{-6}$ cm$^3$ (STP)/cm$^2$ cmHg sec). The selectivity is defined as the mole ratio of the mole fraction of alkene in the feed stream to that in the permeate stream.

EXAMPLE 1

0.4 g of poly(vinylpyrrolidone) (PVP, Mw=1,000,000, Aldrich Co.), 0.703 g of silver tetrafluoroborate (AgBF$_4$) and 0.01054 g of alkyl polyglucopyranoside (n-octyl β-D-glucopyranoside, APG) were mixed with 1.6 g of water with stirring to prepare a solution (PVP content=20 wt. %, [CO]:[Ag]=1:1 in mole ratio). The solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was cut in a size of 2×2 cm$^2$ and evaluated in regard to gas permeance. The permeance was measured with an ethylene/ethane mixed gas (50:50 vol. %) at the room temperature with the up stream pressure of 40 psig and the down stream pressure of zero psig. The volume of the passing gas was measured with a soap-bubble flow meter, and the selectivity was determined from the composition measured by the gas chromatography. The results are presented in Table 4.

As seen from Table 4, the membrane prepared in Example 1 had a permeance and selectivity equal to or greater than the conventional membrane containing no surfactant (in Comparative Example 1).

TABLE 4

|  | [AgBF$_4$]:[APG] | Gas Permeance | Selectivity |
| --- | --- | --- | --- |
| Comparative Example 1 | 300:0 | 37.0 | 50.6 |
| Example 1 | 300:1 | 35.8 | 57.9 |

EXAMPLE 2

0.4 g of poly(vinylpyrrolidone) (PVP, Mw=1,000,000, Aldrich Co.), 0.703 g of silver tetrafluoroborate (AgBF$_4$) and 0.035 g of alkyl polyglucopyranoside (n-octyl β-D-glucopyranoside, APG) were mixed with 1.6 g of water with stirring to prepare a solution (PVP content 20 wt. %, [CO]:[Ag]=1:1 in mole ratio). The solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was cut in a size of 2×2 cm$^2$ and evaluated in regard to gas permeance. The permeance was measured with an ethylene/ethane mixed gas (50:50 vol. %) at the room temperature with the up stream pressure of 40 psig and the down stream pressure of zero psig. The volume of the passing gas was measured with a soap-bubble flow meter, and the composition was determined by the gas chromatography. The results are presented in Table 5.

As seen from Table 5, the membrane prepared in Example 2 had a permeance and selectivity equal to or greater than the conventional membrane containing no surfactant.

TABLE 5

|  | [AgBF$_4$]:[APG] | Gas Permeance | Selectivity |
| --- | --- | --- | --- |
| Comparative Example 1 | 100:0 | 37.0 | 50.6 |
| Example 2 | 100:1 | 35.2 | 58.7 |

EXAMPLE 3

0.4 g of poly(vinylpyrrolidone) (PVP, Mw=1,000,000, Aldrich Co.), 0.703 g of silver tetrafluoroborate (AgBF$_4$) and 0.01054 g of alkyl polyglucopyranoside (n-octyl β-D-glucopyranoside, APG) were mixed with 1.6 g of water with stirring to prepare a solution (PVP content=20 wt. %, [CO]:[Ag]=1:1 in mole ratio). The solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was exposed to UV rays in a room for one month and then cut in a size of 2×2 cm$^2$ for evaluation of gas permeance. For a comparison, the membrane prepared in Comparative Example 1 was exposed under the same conditions. The measurement was performed in the same manner as described in Example 1.

The membrane exposed under UV rays for one month in Example 3 had no particular change in permeance or selectivity. This result shows that the transition metal carrier is stable.

TABLE 6

|  | Exposed Time | [AgBF$_4$]:[APG] | Gas Permeance | Selectivity |
| --- | --- | --- | --- | --- |
| Comparative Example 2 | One month | 300:0 | 45.8 | 7.8 |
| Example 3 | One month | 300:1 | 35.7 | 50.9 |

EXAMPLE 4

0.4 g of poly(vinylpyrrolidone) (PVP, Mw=1,000,000, Aldrich Co.), 0.703 g of silver tetrafluoroborate (AgBF$_4$) and 0.01054 g of alkyl polyglucopyranoside (n-octyl β-D-glucopyranoside, APG) were mixed with 1.6 g of water with stirring to prepare a solution (PVP conten=20 wt. %, [CO]:[Ag]=1:1 in mole ratio). The solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was exposed to UV rays in a room for 15 days and then cut in a size of 2×2 cm² for evaluation of gas permeance. For a comparison, the membrane prepared in Comparative Example 1 was exposed under the same conditions. The measurement was performed in the same manner as described in Example 1.

The membrane exposed under UV rays for 15 days in Example 4 had no particular change in permeance or selectivity. This result shows that the transition metal carrier is stable.

TABLE 7

| | Exposed Time | [AgBF$_4$]:[APG] | Gas Permeance | Selectivity |
|---|---|---|---|---|
| Comparative Example 3 | 15 days | 300:0 | 39.1 | 25.5 |
| Example 4 | 15 days | 300:1 | 32.2 | 58.4 |

EXAMPLES 5 AND 6

0.4 g of poly(vinylpyrrolidone) (PVP, Mw=1,000,000, Aldrich Co.), 0.703 g of silver tetrafluoroborate (AgBF$_4$) and 0.035 g of alkyl polyglucopyranoside (n-octyl β-D-glucopyranoside, APG) were mixed with 1.6 g of water with stirring to prepare a solution (PVP content=20 wt. %, [CO]:[Ag]=1:1 in mole ratio). The solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was exposed to UV rays in a room for a defined period of time and then cut in a size of 2×2 cm² for evaluation of gas permeance.

The membranes exposed under UV rays for a defined period of time in Examples 5 and 6 had no particular change in permeance or selectivity. This result shows that the transition metal carrier is stable.

TABLE 8

| | Exposed Time | [AgBF$_4$]:[APG] | Gas Permeance | Selectivity |
|---|---|---|---|---|
| Example 5 | 15 days | 100:1 | 33.0 | 68.1 |
| Example 6 | One month | 100:1 | 35.6 | 57.7 |

EXAMPLES 7, 8 AND 9

1 g of poly(2-ethyl-2-oxazoline) (POZ, Mw=500,000, Tg=60°C., Aldrich Co.) and 2 g of silver tetrafluoroborate (AgBF$_4$) were mixed with 97 g of water. Alkyl polyglucopyranoside (n-octyl β-D-glucopyranoside, APG) was then added to the solution at a mole ratio of 100:1. The resulting solution was coated on a porous asymmetric supporting membrane (supplied by Saehan Co.) using a Mayer bar. The coated membrane was completely dried in a drying oven of 40° C. for 2 hours and a vacuum oven for 48 hours. The membrane was exposed to UV rays in a room for a defined period of time and then cut in a size of 2×2 cm² for evaluation of gas permeance.

The gas permeance was measured at the room temperature with the feed stream pressure of 60 psig and the down stream pressure of zero psig. The volume of the passing gas was measured with a soap-bubble flow meter. The permeance and selectivity to propylene and propane are presented in Table 9.

The membranes exposed to UV rays for a defined period of time had no particular change in permeance or selectivity. This result shows that the transition metal carrier is stable.

TABLE 9

| | Exposed Time | [AgBF$_4$]:[APG] | Propylene Permeance | Selectivity |
|---|---|---|---|---|
| Example 7 | Zero | 100:0 | 14.2 | 142 |
| Example 8 | 15 days | 100:1 | 15 | 140 |
| Example 9 | One month | 100:1 | 15.2 | 140 |
| Comparative Example 4 | One month | 100:0 | 18.5 | 70 |

EXAMPLES 10, 11 AND 12

Procedures were performed in the same manner as described in Example 7 to prepare a complex membrane of POZ, silver trifluoromethane sulfonate (AgCF$_3$SO$_3$) and alkyl polyglucopyranoside (n-octyl β-D-glucopyranoside, APG). The content of the aqueous POZ solution was 1 wt. % and the mole ratio of AgCF$_3$SO$_3$, POZ and APG was 100:50:1. The permeance to pure propylene and propane was measured in the same manner as described in Examples 7, 8 and 9. The permeance and selectivity to propylene and propane are presented in Table 10.

TABLE 10

| | Exposed Time | [AgBF$_4$]:[APG] | Propylene Permeance | Selectivity |
|---|---|---|---|---|
| Example 10 | Zero | 100:0 | 21.2 | ~200 |
| Example 11 | 15 days | 100:1 | 22 | ~200 |
| Example 12 | One month | 100:1 | 23 | ~200 |
| Comparative Example 5 | One month | 100:0 | 25.2 | ~150 |

EXAMPLE 13

Procedures were performed in the same manner as described in Example 7 to prepare a complex membrane of POZ, silver trifluoromethane sulfonate (AgCF$_3$SO$_3$) and TWEEN 20. The content of the aqueous POZ solution was 1 wt. % and the mole ratio of AgCF$_3$SO$_3$, POZ and TWEEN 20 was 100:50:1. The membrane exposed to UV rays for a defined period of time had no particular change in permeance or selective permeance. This result shows that the transition metal carrier is stable.

EXAMPLE 14

Procedures were performed in the same manner as described in Example 7 to prepare a complex membrane of POZ, silver trifluoromethane sulfonate (AgCF$_3$SO$_3$) and PLURONIC F38 (BASF Co.). The content of the aqueous POZ solution was 1 wt. % and the mole ratio of AgCF$_3$SO$_3$, POZ and PLURONIC F38 was 100:50:1. The membrane exposed to UV rays for a defined period of time had no particular change in permeance or selectivity. This result shows that the transition metal carrier is stable.

The novel facilitated transport membrane prepared by coating a porous supporting membrane with a polymer electrolyte comprising an appropriate salt of a transition metal, a surfactant and a non-volatile polymer forms a complex of the non-volatile polymer ligand and the metal ion of the metal salt contained in the polymer electrolyte, causing a selective and reversible reaction between the metal ion of the complex and the double bond of an alkene to facilitate the transport of the alkene and thereby enable a selective separation of the alkene, and maintaining the activity of the electrolyte in a solid state containing the metal salt and the non-volatile polymer in a complete dry condition. In addition, the facilitated transport membrane destitute of a volatile component in operation contains the surfactant for maintaining the activity of the metal ion to guarantee long-term operation stability, and is therefore suitable for alkane/alkene separation.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A facilitated transport membrane for separation of alkene-based hydrocarbons, comprising:
   a polymer electrolyte layer comprising a salt of a transition metal selectively and reversibly reactive to an alkene, a non-volatile polymer, and a surfactant for maintaining the activity of the transition metal, the polymer electrolyte layer being in a solid state at an operating temperature and a porous supporting membrane.

2. The facilitated transport membrane as claimed in claim 1, wherein the cation of the transition metal has an electronegativity of 1.6 to 2.3.

3. The facilitated transport membrane as claimed in claim 1, wherein the transition metal is at least one selected from the group consisting of Mn, Fe, Co, Ni, Cu, Ag, Mo, Tc, Ru, Rh, Pd, Ag, Re, Os, Ir, Pt, and complexes of these metals.

4. The facilitated transport membrane as claimed in claim 1, wherein the salt of the transition metal containing the anion of the transition metal has a lattice energy of less than 1,000 KJ/mol.

5. The facilitated transport membrane as claimed in claim 4, wherein the anion of the transition metal is at least one selected from the group consisting of $F^-$, $Cl^-$, $Br^-$, $I^-$, $CN^-$, $NO_3^-$, $SCN^-$, $ClO_4^-$, $CF_3SO_3^-$, $BF_4^-$, $AsF_6^-$, $PF_6^-$, $SbF_6^-$, $AlCl_4^-$, $N(SO_2CF_3)_2^-$, and $C(SO_2CF_3)_3^-$.

6. The facilitated transport membrane as claimed in claim 1, wherein the salt of the transition metal includes a complex salt of the transition metal, or a mixture of the salts of the transition metal.

7. The facilitated transport membrane as claimed in claim 6, wherein the complex salt of the transition metal is at least one selected from the group consisting of $RbAg_4I_5$, $Ag_2HgI_4$, $RbAg_4I_4CN$, $AgHgSI$, $AgHgTeI$, $Ag_3SI$, $Ag_6I_4WO_4$, $Ag_7I_4AsO_4$, $Ag_7I_4PO_4$, $Ag_{19}I_{15}P_2O_7$, $Rb_4Cu_{16}I_7Cl_{13}$, $Rb_3Cu_7Cl_{10}$, AgI-(tetralkyl ammonium iodide), $AgI-(CH_3)_3SI$, $C_6H_{12}N_4 \cdot CH_3I$—$CuI$, $C_6H_{12}N_4 \cdot 4CH_3Br$—$CuBr$, $C_6H_{12}N_4 \cdot 4C_2H_5Br$—$CuBr$, $C_6H_{12}N_4 \cdot 4HCl$—$CuCl$, $C_6H_{12}N_2 \cdot 2CH_3I$—$CuI$, $C_6H_{12}N_2 \cdot 2CH_3Br$—$CuBr$, $C_6H_{12}N_2 \cdot 2CH_3Cl$—$CuCl$, $C_5H_{11}NCH_3I$—$CuI$, $C_5H_{11}NCH_3Br$—$CuBr$, and $C_4H_9ON \cdot CH_3I$—$CuI$.

8. The facilitated transport membrane as claimed in claim 1, wherein the surfactant is a non-ionic surfactant being at least one selected from the group consisting of polyalkyl glucoside, alkyl glucamide, higher alcohol ethylene oxide addition product, alkylphenol ethylene oxide addition product, higher fatty acid ethylene oxide addition product, polyalcohol fatty acid ester ethylene oxide addition product, higher alkylamine ethylene oxide addition product, fatty acid amide ethylene oxide addition product, ethylene oxide addition product of fatty oil, and polypropylene glycol ethylene oxide addition product;
   the polyalcohol being at least one selected from the group consisting of fatty acid ester of glycerol, fatty acid ester of pentane erithritol, fatty acid ester of sorbitol and sorbitane, fatty acid ester or sugar, fatty acid amide of alkylamine, alkylester of polyalcohol, or mixtures thereof.

9. The facilitated transport membrane as claimed in claim 8, wherein the non-ionic surfactant has a mole ratio of transition metal to surfactant in the range of 10000:1 to 10:1.

10. The facilitated transport membrane as claimed in claim 1, wherein the non-volatile polymer has a dielectric constant of greater than 2.7.

11. The facilitated transport membrane as claimed in claim 1, wherein the non-volatile polymer is poly(tetrafluoroethylene), polycarbonate, poly(N-isopropyl acrylamide), poly(phenylene sulfide), poly(methyl methacrylate), poly(methylene oxide), poly(methacrylate), polyvinyl acetate), poly(epichlorohydrin), poly(acrylamide), poly(oxy-2,6-dimethyl-1,4-phenylene), poly(2-ethyl-2-oxazoline), poly(vinylpyrrolidone), poly(acrylonitrile), poly(methacrylamide), poly(vinylalcohol), poly(N-dimethyl acrylamide), poly(N-dimethyl methacrylamide), or homopolymers or copolymers thereof, or derivatives containing them as a backbone or a side chain, or physical mixtures thereof.

12. The facilitated transport membrane as claimed in claim 1, wherein the polymer constituting the polymer electrolyte layer has a weight fraction of less than 50 wt. %.

13. The facilitated transport membrane as claimed in claim 1, wherein the porous supporting membrane comprises a porous polymer membrane or a porous ceramic membrane.

* * * * *